United States Patent
Van Der Schuit

(10) Patent No.: US 12,492,510 B2
(45) Date of Patent: Dec. 9, 2025

(54) FLEXIBLE CABLE WITH INCREASED LIFE SPAN, AND A METHOD FOR PRODUCING A FLEXIBLE CABLE

(71) Applicant: Cabin Air Group B.V., Joure (NL)

(72) Inventor: Rinze Jan Van Der Schuit, Oranjewoud (NL)

(73) Assignee: Cabin Air Group B.V., Joure (NL)

( * ) Notice: Subject to any disclaimer, the term of this patent is extended or adjusted under 35 U.S.C. 154(b) by 0 days.

(21) Appl. No.: 18/843,442

(22) PCT Filed: Mar. 13, 2023

(86) PCT No.: PCT/NL2023/050124
§ 371 (c)(1),
(2) Date: Sep. 3, 2024

(87) PCT Pub. No.: WO2023/177286
PCT Pub. Date: Sep. 21, 2023

(65) Prior Publication Data
US 2025/0179729 A1    Jun. 5, 2025

(30) Foreign Application Priority Data

Mar. 14, 2022 (NL) ...................................... 2031274
Oct. 3, 2022 (NL) ...................................... 2033210
Jan. 4, 2023 (NL) ...................................... 2033909

(51) Int. Cl.
*D07B 1/18* (2006.01)
*D07B 1/02* (2006.01)

(52) U.S. Cl.
CPC .............. *D07B 1/18* (2013.01); *D07B 1/025* (2013.01); *D07B 2201/1004* (2013.01);
(Continued)

(58) Field of Classification Search
CPC ................................. D07B 1/025; D07B 1/18
See application file for complete search history.

(56) References Cited

U.S. PATENT DOCUMENTS

| | | | |
|---|---|---|---|
| 4,255,836 A | 3/1981 | Dunahoo | |
| 7,641,177 B2 * | 1/2010 | Rawdon | ................ F16G 11/146 254/393 |

(Continued)

FOREIGN PATENT DOCUMENTS

| | | |
|---|---|---|
| DE | 3924379 A1 | 1/1991 |
| EP | 0374067 A1 | 6/1990 |

(Continued)

OTHER PUBLICATIONS

Translation JP 2014218335.*
Translation JP 2012148877.*

*Primary Examiner* — Shaun R Hurley
(74) *Attorney, Agent, or Firm* — Rogowski Law LLC

(57) ABSTRACT

A flexible cable 1 is produced by endless winding of at least one yarn 6 around two thimbles 2, 4. The yarn 6 comprises aramid or similar fibres. Each thimble 2, 4 holds a stack 9 of a plurality of layers 10 of turns of the yarn 6. The cable 1 comprises a resin 12 which is provided at at least one of the first and second thimble only, for mutually connecting the layers of turns of the yarn and to retain a tangential orientation of the respective yarn layers 10 with respect to each other when the flexible endless winding cable is subject to a load. The cable has optional carbon fibre sheets 18, 20 between preselected yarn layers at the thimbles.

21 Claims, 2 Drawing Sheets

(52) U.S. Cl.
CPC ............... *D07B 2201/1092* (2013.01); *D07B 2201/2009* (2013.01); *D07B 2201/2095* (2013.01); *D07B 2205/205* (2013.01); *D07B 2205/3007* (2013.01); *D10B 2331/021* (2013.01)

(56) References Cited

U.S. PATENT DOCUMENTS

2017/0037570 A1* 2/2017 Van Der Schuit ........................... G02B 6/02076
2018/0334776 A1* 11/2018 Van Der Schuit ....... D07B 1/18

FOREIGN PATENT DOCUMENTS

| GB | 2380984 A | | 4/2003 | |
|----|-----------|---|--------|---|
| JP | 2012148877 A | * | 8/2012 | ............... D07B 1/18 |
| JP | 2014218335 A | * | 11/2014 | ............... D07B 1/18 |
| NL | 2012848 B1 | | 3/2016 | |
| WO | 2017086778 A1 | | 5/2017 | |

\* cited by examiner

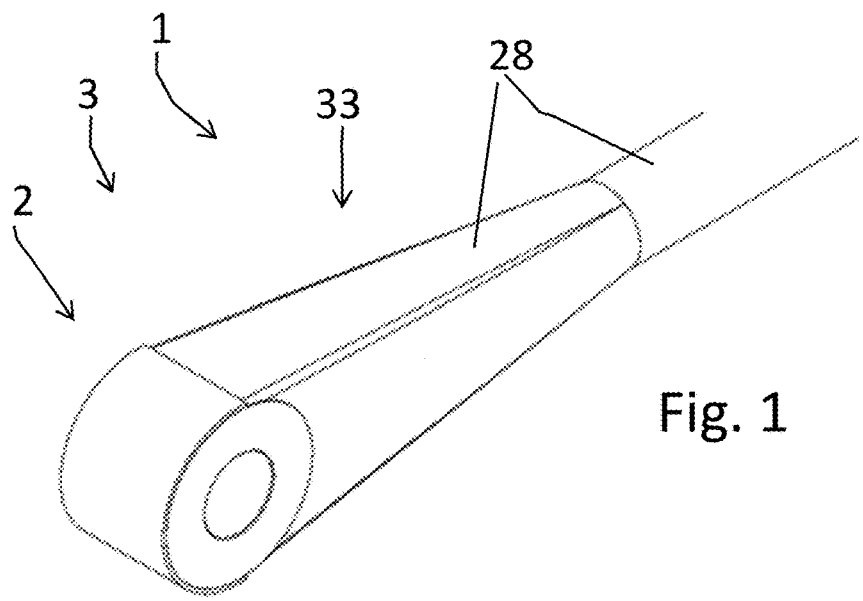
Fig. 1
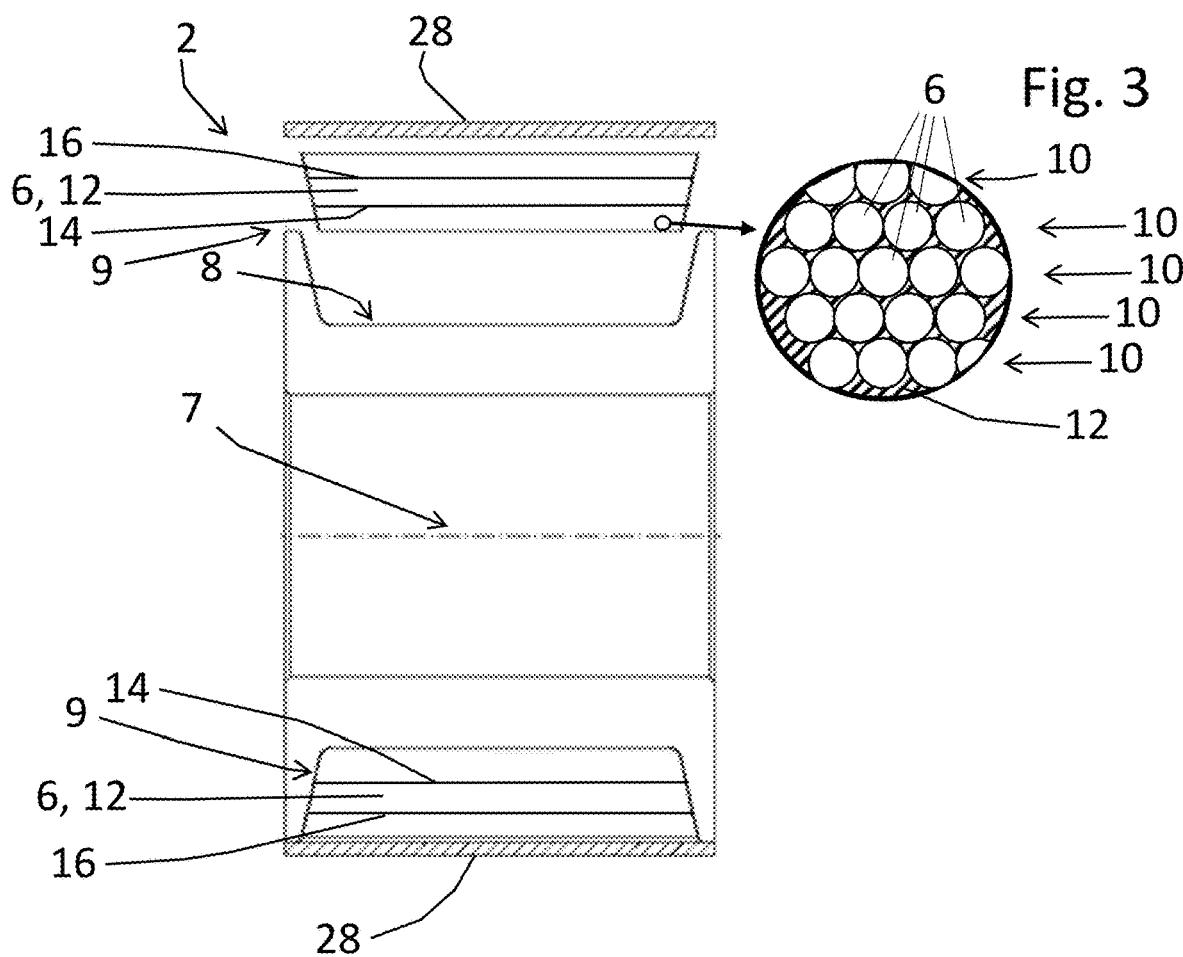
Fig. 2
Fig. 3

FLEXIBLE CABLE WITH INCREASED LIFE SPAN, AND A METHOD FOR PRODUCING A FLEXIBLE CABLE

CROSS-REFERENCE TO RELATED APPLICATIONS

This application is a national stage application (under 35 USC § 371) of PCT/NL2023/050124, filed Mar. 13, 2023, which claims benefit of NL 2031274, filed Mar. 14, 2022, NL 2033210, filed Oct. 3, 2022 and NL 2033909, filed Jan. 4, 2023, the contents of each of which is incorporated by reference herein.

BACKGROUND OF THE INVENTION

The invention relates to a flexible endless winding cable, and a method for producing a flexible endless winding cable.

A cable of this type can be used in different types of industry, including but not limited to offshore, mining and heavy lifting and construction. In offshore, a cable of this type can be used as a mooring line for a floating oil exploration or production facility, or for a floating wind turbine. In particular, a cable of this type can be used as a so-called tendon or tether to anchor a (semi-submersible) floating object under tension to a bottom of a sea or ocean to form a tension leg platform (TLP) as a base for a wind turbine or other facility. In mining and heavy lifting such a cable may be used as a pendant for a crane. In construction such a cable may be used as a tension member in a bridge or suspension cable of a roof.

The concept of endless winding cable, or rope, is explained on the page Rope of the English version of Wikipedia as follows: "Endless winding rope is made by winding single strands of high-performance yarns around two end terminations until the desired break strength or stiffness has been reached. This type of rope (often specified as cable to make the difference between a braided or twined construction) has the advantage of having no construction stretch as is the case with above constructions".

An endless winding cable is known from WO-2017/086778 (WO'778). This document discloses a cable which is produced by winding a main yarn around two thimbles which form two end fittings in the final cable. In order to reduce wear of the cable, WO'778 proposes to provide a stack of layers of fibres of a second type on a bearing surface of the thimbles. The stack of the fibres of the second type avoids direct contact between the main yarn and the bearing surface. As a result, the main yarn does not wear due to movements of the main yarn relative to the bearing surface. The properties of the fibres of the second type are chosen such that their wear is less than that of the main yarn.

While the solution of WO-2017/086778 (WO'778) provides an improvement over the then known prior art, further improvement in cable strength and life span continues to be sought.

The invention aims to provide a cable with higher strength and/or a longer life span than the cable of WO'778, or at least to provide an alternative.

SUMMARY OF THE INVENTION

A flexible cable produced by endless winding of at least one yarn around two thimbles, comprising a first thimble and a second thimble, and at least one yarn. The yarn comprises high modulus synthetic or natural fibres with Young's modulus of at least 55 GPa, in particular at least 100 GPa, preferably at least 110 GPa, more preferably at least 120 GP, as determined by ASTM D7269 and chosen from a list comprising aramid fibres, polyarylate fibres, PBO fibres, and basalt fibres. The first thimble and the second thimble are provided at opposite ends of the cable. The at least one yarn extends from the first thimble to the second thimble, turns around the second thimble, extends from the second thimble to the first thimble, and turns around the first thimble, such that the yarn forms turns around the first and second thimbles, and each thimble holds a stack of a plurality of layers of turns of the yarn. An adhesive is provided at at least one of the first and second thimble only and mutually connects at least two of the plurality of layers of turns of the yarn in the stack of the respective first or second thimble to retain a tangential orientation of the respective yarn layers with respect to each other when the flexible endless winding cable is subject to a load.

The current invention is based on the discovery that a failure mechanism occurs when a flexible endless winding cable is rolled up for transport. In the rolled-up condition, the cable is subject to a load, as the fibres on the radial outer side of the roll are subject to stress while fibres on the radial inner side of the roll are compressed. This local difference in load results in a slight shift of the yarn layers with respect to each other in the stack of one or both thimbles. This shifted position may remain at least partly after the cable is unrolled, resulting in an unequal length and thus uneven load on the fibres when the cable is subjected to a load in use. As the claimed type of fibres have a relative high Young's modulus, the difference in length results in a part of the yarns being subject to less load than designed and another part being subject to a higher load than designed, resulting in a premature failing of yarns in the higher loaded part.

Connecting at least two layers together using an adhesive prevents relative movement of these layers when the cable is rolled up, or otherwise put in a curved orientation, and thus prevents unequal load of the yarns on one side of the cable with respect to the yarns on the other side. It is sufficient to apply the adhesive to a portion of the circumferential part of the thimble that supports the yarns only, which prevents the shifting caused by rolling up the cable.

In an embodiment, the adhesive extends over the portion of the circumferential part only, in particular said portion is centred about the longitudinal axis of the cable. This embodiment reduces the cost of applying the adhesive to the portion, in particular the central portion, compared to applying it to the full circumferential part, not only in terms of material but also in terms of labour.

For example, the adhesive extends over less than 50% of the circumferential part, e.g. less than 25% of the circumferential part, in particular less than 10% of the circumferential part. The adhesive extends over more than 1% of the circumferential part, in particular more than 2% of the circumferential part, more in particular more than 5% of the circumferential part. Preferably, the adhesive extends over one third to one quarter of the circumferential part.

In another embodiment, the adhesive extends over the entire circumferential part of the thimble that supports the yarns. The invention according to this embodiment is based on the discovery that the prior art cables prematurely fail due to micro abrasion between the yarn layers in the end fittings. This is caused by any one or more of the following mechanisms. The length of the yarn in the thimble is larger in an outer layer of turns of the yarn than in an inner layer of turns. While this difference in length is small in an absolute sense from one layer to a next layer, it does result in a different elongation of the yarn under load, because the amount of elongation corresponds to the length of the yarn, for a given Young's modulus and cross section of, and tension in, the yarn. When a cable is subject to load cycles by repeatedly increasing and decreasing of a pull load on the thimbles, the difference in elongation results in a reciprocating movement of each layer of turns of the yarn with respect to the neighbouring layers. This movement causes micro abrasion of the yarns. A further failure mechanism which is also caused by load cycles is that the stack of yarn layers is slightly compressed because the longitudinal stress in each of the yarn layers is transferred to the thimbles as a pressure in a radial inward direction via intermediate yarn layers. This inward directed pressure results in a slight compression of the intermediate layers. Uncompressed the stack of turns of the yarn may comprise 50% air, which may be compressed to a minimum of 35% air. The compression results in a reciprocating movement of outer yarn layers with respect to inner yarn layers, and thus in micro abrasion.

According to the invention, at least two of the plurality of layers of turns of the yarn in the stack of yarns of at least one of the thimbles are mutually connected by an adhesive so that the respective layers retain a tangential orientation with respect to each other when the flexible endless winding cable is subject to a maximum design load of the flexible endless winding cable. This prevents relative movement of these layers and thus wear of the yarns in the layers in the stack.

The invention provides a solution for reducing micro abrasion of endless winding cables made of a yarn which comprises high modulus synthetic, or natural fibres with Young's modulus of at least 55 GPa. At the moment of filing the current application, the applicant has used and/or tested a yarn comprising aramid fibres, polyarylate fibre, PBO fibres, or basalt fibres for such endless winding cables. All endless cables with such yarns that have been tested show an increase in life span or more than 10 to 20 times the life span of a similar cable without applying the current invention. The current application intends to further provide protection, at least by means of equivalence, for endless winding cables with a yarn made of fibres which have comparable properties as the above mentioned fibres with respect to strength, Young's modulus, and roughness of the fibre surface, and which thus suffer from the same or similar failure mechanisms.

Additional layers of yarns also may comprise adhesive to connect yarns of such layers together within a respective stack. In particular, substantial all layers in the at least one of the thimbles are connected by the adhesive.

The adhesive is provided and cured in a respective yarn layer at one of, or all of, the thimbles only, and not along the full length of the cable between the yarns. Providing and curing an adhesive between the yarns over the full length of the cable would result in a stiff rod instead of a flexible cable. The phrase an adhesive is provided at at least one of the first and second thimble only is interpreted within the context of this specification accordingly.

Preferred embodiments are defined in the dependent claims.

In an embodiment, the adhesive comprises a resin, in particular an epoxy resin.

The resin offers another positive effect of retaining the layers of turns of the yarn in the stacked configuration in their radial position relative to the centre of the thimble. Each layer transfers part of the load on the cable to the relative thimble. In a cable according to WO'778 this load is transferred as pressure on the underlying yarn layers, layers which are between the relevant layer and a bearing surface of the thimble. This pressure may results in a decrease of the load capacity of the fibres of the yarn, because high performance fibres, such as aramid fibres, loose part of their load capacity if a transverse load is applied to the fibre. By applying resin, at least part of the load is transferred via the resin instead of the underlying yarns and the compression and thus wear is less, or even completely eliminated. The resin acts in particular as a matrix. Another positive effect of the resin is that local transfer loads on the yarns are decreased, because the surface of the yarns are rough on a micro level and transfer loads are transferred to adjoining yarns via the resin and not mainly via the protruding parts of the rough yarn surfaces.

It is noted that US2013/0000087 (US'087) discloses a cable-end connection for a cable, which is constructed from a plurality of intertwined filaments. The cable-end connection comprises an end part for installing or supporting the cable. The end part is fastened to one end of the cable, and is made from a castable, curable material, such as a synthetic resin, and connected without additional mechanical-connecting elements in a form-fitting manner to the filaments solely by being cast around or moulded on. The filaments are released from an original stranding assembly in a region of the end part and distributed essentially uniformly. The end part is produced in a casting mould by injection moulding of synthetic resin, and the filaments are embedded and cast in a form-fitting manner around the material of the end part under pre-stress. The synthetic resin of US'087 thus forms the cable-end fitting. If the synthetic resin would break, or if the embedded filaments would detach from the resin, then the whole end fitting fails. In contrast, the end fitting of the current invention is made from a thimble with uninterrupted yarn turns, wherein the resin or any other adhesive only serves to prevent mutual movement between the yarn layers. If the adhesive would fail, then the inventive end fitting would still function as end fitting like the one in WO'778, suffering from long term wear but not failing immediately as the cable-end fitting of US'087.

In an embodiment, the yarn layers within both thimbles are provided with the adhesive. In an embodiment with more than two thimbles, all thimbles are provided with the adhesive.

In another embodiment, all yarn layers in at least one of the thimbles are provided with the adhesive.

In an embodiment, a stack of fibres of a type which is different of the type of fibres of the yarn, in particular a sheet of such fibres, is provided on a bearing surface of at least one thimble before winding the yarn, as disclosed in more detail in WO-2017/086778.

In an embodiment, the aramid fibres are para-aramid fibres. This type of fibre is very strong compared to metal and to most other types of synthetic fibres.

In an embodiment, the cable comprises at least a first sheet which is provided in the stack of layers of turns of the yarn between two layers of the stack of one of the first and second thimble. Adding a first sheet between adjacent yarn turn layers of the thimble increases the stiffness of the stack of layers and thus minimizes relative movement between the layers of yarn turns at the thimble.

In an embodiment, the at least first sheet is one of a plurality of sheets wherein each sheet is provided separately in the stack of layers of turns of the yarn between two layers of the stack of the one of the first and second thimble. This configuration with a plurality of sheets distributes the stress which is required to make a stack of yarn layers with interposed sheets sufficiently stiff over multiple sheets.

In an embodiment, the yarn stacks of both thimbles are each provided with at least one sheet between two layers of yarns.

In an embodiment the at least first sheet comprises a unidirectional fabric. Such a fabric provides maximum strength and stiffness in the direction of the fibres of the fabric. In particular, the direction of the fibres in the unidirectional fabric is provided substantially parallel to the direction of the yarn.

In an embodiment, the stiffness of the at least first sheet is greater than the stiffness of the yarn. This increases the arresting effect of the sheet on the yarn.

In an embodiment, the at least first sheet comprises sheet fibres and the Young's modulus of the sheet fibres is higher than, in particular at least twice as high as, the Young's modulus of the high modulus synthetic fibres of the yarn.

In an embodiment, the at least first sheet comprises fibres which are chosen from a list consisting of carbon fibres, PBO (Polybenzobisoxazole) fibres, and high modulus aramid fibres.

In an embodiment, the at least first sheet comprises more than one type of fibres, wherein at least one of these fibre types is chosen from a list consisting of carbon fibres, PBO fibres, and high modulus aramid fibres.

In another aspect, the invention relates to a method for producing a flexible endless winding cable, in particular an inventive flexible endless winding cable as defined in the preceding paragraphs.

By applying adhesive at least one time in at least one of the thimbles, at least two layers of yarn turns in the respective thimble are mutually connected. As a result, the method according to the invention provides an endless winding cable with the positive characteristics as discussed above. The adhesive is not applied and/or not cured at the endless winding cable extending between the first thimble and the second thimble, such that the flexible endless winding cable remains flexible between the first thimble and the second thimble.

In particular, the one step of applying the adhesive results in connecting more than two layers of yarn turns. Due to tension in the yarn during winding, superfluous adhesive is pressed from the layer of yarn turns on which it is initially applied into further layers. Adding more adhesive than what is required for connecting two layers of yarn turns thus results in connecting more layers of yarn turns than steps of adding adhesive.

In an embodiment, the method comprises a step of putting at least a first sheet on one of the layers of yarn turns in one of the first and second thimbles after providing at least one layer of yarn turns and before providing a subsequent layer of yarn turns.

In an embodiment, the method comprises a step of putting a further sheet on another one of the layers of yarn turns in one of the first and second thimbles.

In an embodiment, the step of adding an adhesive to the layers of yarn turns in at least one of the thimbles is repeated at least a second time during the producing of the flexible endless winding cable.

In an embodiment, the step of applying an adhesive to the layers of yarn turns in at least one of the thimbles is repeated after n layers of yarn turns are provided in at least one of the thimbles, wherein n is an integer of less than 15, in particular less than 10, in particular less than 5, more in particular less than 2. This enables precise dosing of the required amount of adhesive. In an embodiment, n is more than 2. Preferably, n is chosen from the range 5 to 10.

DESCRIPTION OF THE DRAWINGS

The invention, its effects, and advantages will be explained in more detail on the basis of the schematic drawing, in which:

FIG. 1 shows an end of a cable according to the invention;
FIG. 2 shows partly exploded section II-II from FIG. 4;
FIG. 3 shows an enlarged detail from FIG. 2.

DETAILED DESCRIPTION

Figure 4:
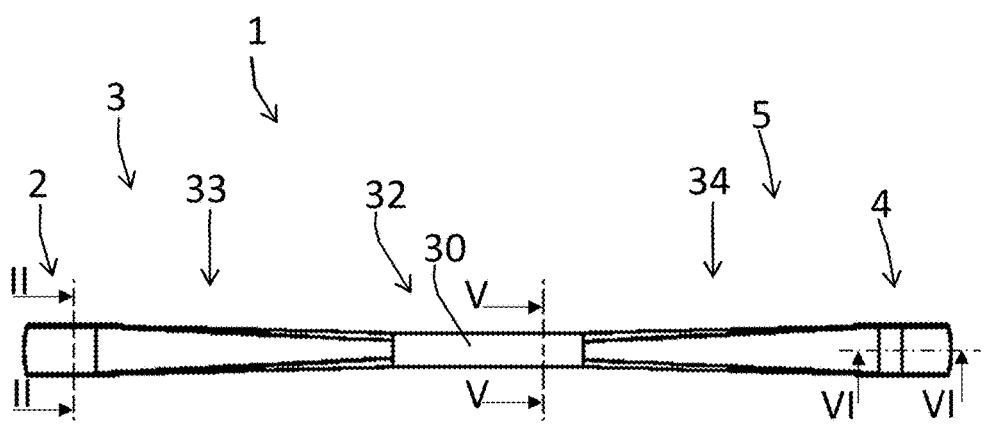
FIG. 4 shows a top view of the cable of FIG. 1.

The FIGS. 1-6 show a flexible cable according to the invention, which is denoted in its entirety by reference number 1. The cable 1 has a first end fitting 3, comprising a first thimble 2, a second end fitting 5, comprising a second thimble 4, and a plurality of yarns 6. The first 2 and the second 4 thimble are made of stainless steel, are provided at opposite ends of the cable 1, and each have a centre 7. The plurality of yarns 6 are in this embodiment ten (10) yarns 6 which all extend from the first to the second thimble, turn around the second thimble 4, extend from the second thimble 4 to the first thimble 2, and turn around the first thimble 2. In this manner each of the plurality of yarns 6 forms a semi-continuous loop around the first and second thimbles. This loop is repeated a plurality of times, in this embodiment 950 times. So each of the yarns 6 makes 950 turns, resulting in a total of 9500 turns of yarns 6. A cable which is produced in this manner is commonly referred to as an endless winding cable. It is noted that the figures are schematic only, and that the actual (relative) dimensions of the cable differ in practice from what is shown. In particular the length of the cable is much longer than what is suggested by FIG. 4, as a cable according to the invention can be as long as hundreds of meters and even more than 1000 meter.

The yarns 6 of this embodiment consist of aramid fibres, in this embodiment para-aramid fibres with a density of 3220 dtex, and a Young's modulus of 112 GPa. These yarns are sold under the name Twaron® D2200 by Teijin Aramid.

FIG. 2 shows in cross section that the thimble 2 has a bearing surface 8. The thimble 2 holds a stack 9 with a plurality of layers 10 of turns of the yarn 6. This is shown in more detail in FIG. 3, which is a strongly enlarged and schematic view of five (5) layers 10 of turns of the yarn 6. In the upper part of FIG. 2 the stack 9 is shown in an exploded view for clarity. In reality, the whole stack 9 is held in the first thimble 2 as shown in the lower part of FIG. 2. The second thimble 4 holds layers of the same yarn turns 6 in the same manner and is therefore not shown in detail.

A plurality of yarn layers 10 at one or both of the end fittings 3, 5 of the cable 1 is connected to each other by an adhesive, in this embodiment an epoxy resin 12. In this embodiment the epoxy resin 12 is provided at each end fitting 3, 5 for mutually connecting all the layers 10 of turns of the yarn 6 in the stack of each thimble 2, 4, and retaining a tangential orientation of the respective yarn layers 10 with respect to each other when the flexible endless winding cable is subject to a load.

The cable 1 of this embodiment comprises a plurality of sheets 14, 16, 18, 20 at the end fittings 3, 5. A first sheet 14 and a second sheet 16 are provided in the stack 9 of layers 10 of turns of the yarn 6 at the first thimble 2. A third sheet 18 and a fourth sheet 20 are provided in the stack 9 of layers 10 of turns of the yarn 6 at the second thimble 4. Each of the plurality of sheets 14, 16, 18, 20 is provided separately between two layers of the relevant stack 9. The sheets 14, 16, 18, 20 of this embodiment are made of unidirectional carbon fibre fabric.

The epoxy resin 12 interconnects the layers 10 of turns of the yarn 6 and the sheets 14, 16, 18, 20. The sheets increase the stiffness of the stack 9 of each thimble 2, 4, resulting in less movement of the stack as a whole and less relative movement of the layers 10 of turns of yarn 9.

A cable cover 28 extends around the cable 1 from the first thimble 2 to the second thimble 4, and bundles all yarn turns 6 extending between the first and the second thimble 2, 4 in one compact bundle 30 in a middle section 32 of the cable 1. The middle section 32 of this embodiment is shown as being relative short compared to the overall length of the cable 1. In most embodiments, the middle section will be the longest section of the cable. In this embodiment, the cable cover 28 also covers the yarn turns 6 at the end fittings 3, 5. The cable cover 28 creates converging sections 33, 34 of the turns of the yarn 6 which extend from the respective thimble 2, 4 to the middle section 32.

Figure 5:
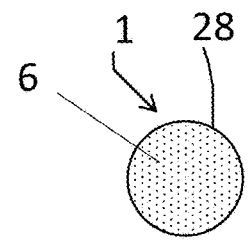
FIG. 5 shows section V-V from FIG. 4.

FIG. 5 shows that the cable 1 in the middle section 32, i.e. between the end fittings 3, 5, is formed by the turns of the yarn 6 without the epoxy resin 12, or any other adhesive, being present between the yarns 6, so that the cable remains flexible.

Figure 6:
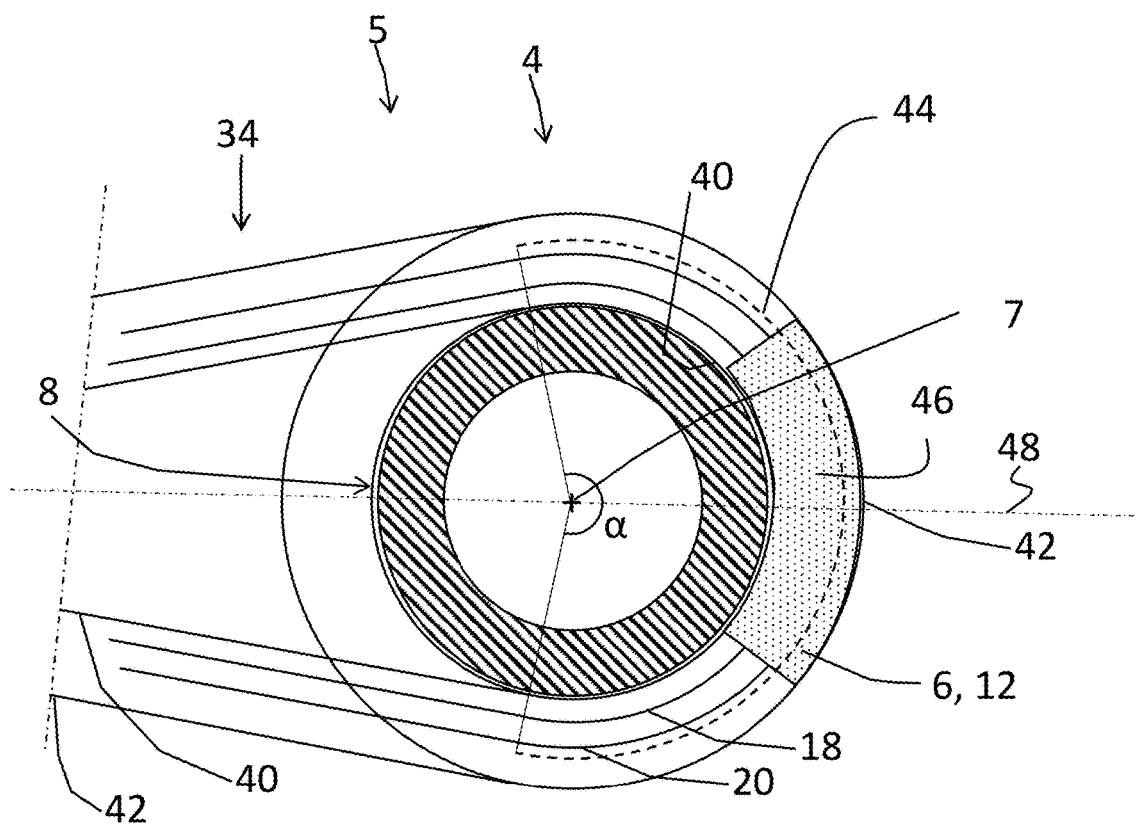
FIG. 6 shows section VI-VI from FIG. 4

FIG. 6 is a schematic longitudinal section through end fitting 5. A longitudinal section through end fitting 3 is similar in this embodiment and therefore not shown in detail. It shows the inner contour 40 and outer contour 42 of the converging section 34 of the bundle of yarn turns 6 as it engages and turns around the thimble 4. As the yarn turns 6 are bundled in the middle section 32, and thus split in two halves and diverge towards the thimble 4, they engage in this embodiment an angle α of approximately 220° of the bearing surface 8 of the thimble 4. The sheets 18, 20 extend over at least the same angle α around the thimble 4, and over the full width of the bearing surface 8. In this embodiment, the sheets 18, 20 extend from the thimbles 2, 4 through the converging sections 33, 34 towards the middle section 32, to increase the surface for affixing the sheets 18, 20 with the epoxy resin 12 to the layers 10 of turns of yarn 6. The sheets 18, 20 do not extend into the middle section 32, so that the elasticity of the middle section 32 is unaffected.

The region of the bearing surface 8 supporting the yarns 6 is referred to as a support region 44. The support region 44 covers the angle α, as indicated by the dashed line in FIG. 6. In general, an adhesive is applied over a portion 46 of the support region 44. In a preferred embodiment, the portion 46 is substantially the whole support region 44. This results in the yarns 6 being interconnected in the whole support region 44, eliminating movements of the yarns 6 with respect to each other and as a result preventing wear of the fibres which would result in a premature failure of the respective cable 1.

In an alternative embodiment, the adhesive is present in further parts of the respective end fitting, in particular within the whole end fitting.

In an alternative embodiment, the adhesive covers less than half of the support region 44, such as ⅓th or ¼th of the support region 44 as illustrated in FIG. 14. The portion 46 with adhesive is centred about a longitudinal axis 48 of the cable 1.

The adhesive connects at least two of the plurality of layers 10 of yarns 6, and in the preferred embodiment substantially all layers of yarns are connected by the adhesive. Connecting substantially all layers of yarn turns results in an even better increase of life span than connecting just two layers. Within the context of this specification, substantially all layers of yarn turns is interpreted as at least 80% of the layers, in particular at least 90% of the layers, more in particular at least 95% of the layers.

In embodiment, no adhesive is applied at the part of the bearing surface 8 that does not support the turns of yarns 6, i.e. the non-support region that spans the remaining (360°−α) degrees, e.g. the remaining 140° in the example of FIG. 6.

A flexible cable according to the invention has been tested and did not break after more than nine millions of load cycles. Several tests have shown that the current invention increases the lifetime, measured in number of load cycles, with a factor of thirty to fifty.

An embodiment of a method for producing a flexible endless winding cable according to the invention, such as the cable of one of the above disclosed embodiments, comprises the steps of:

positioning a first thimble and a second thimble at a predetermined distance from one another, which distance corresponds to a required cable length, providing ten para-aramid yarns, winding the ten yarns from the first thimble to the second thimble, a half turn around the second thimble, back to the first thimble, and a half turn around the first thimble, applying an adhesive to the layers of yarn turns in the thimbles repeating the step of winding the ten yarns around the first and second thimble until a first predetermined number of layers of yarn turns is provided in both the first thimble and the second thimble, putting a first unidirectional carbon fibre sheet on one of the layers of yarn turns in the first thimble, putting a second unidirectional carbon fibre sheet on one of the layers of yarn turns in the second thimble, applying further adhesive to the layers of yarn turns in the thimbles, repeating the step of winding the ten yarns around the first and second thimble over the first sheet and the second sheet until a second predetermined number of layers of yarn turns is provided in both the first thimble and the second thimble, putting a further sheet onto one of the layers of yarn turns in the first thimble, putting a second further sheet onto one of the layers of yarn turns in the second thimble, applying further adhesive to the layers of yarn turns in the thimbles, repeating the step of winding the ten yarns around the first and second thimble until a third predetermined number of layers of yarn turns is provided in both the first thimble and the second thimble, wherein the first, second, and third predetermined number of layers of yarn turns jointly correspond to a required cable thickness, and curing the adhesive, so that the layers of yarn turns retain a tangential orientation with respect to each other when the flexible endless winding cable is subject to a load.

In this embodiment, the adhesive is not applied on every layer, but is applied each time in sufficient quantities to spread through adjoining layers and sheets, so that in the final product adhesive is present between all layers, and between layers and sheets, before the adhesive cures.

In this embodiment, the adhesive is an epoxy resin.

In this embodiment, the epoxy resin a thermosetting polymer which is cured by baking the first and second thimble.

In this embodiment, the first and second thimble are made of stainless steel.

In an alternative embodiment, the adhesive is applied after all layers of yarn turns have been applied to the thimbles, i.e. in each thimble a full stack of layers has been created. The adhesive penetrates between the yarn turns of the layers, as well as through the sheets, and spreads through the complete stack.

An apparatus which is suitable for the method of making an endless winding cable is described in WO-2017/099589 and WO-2017/086778 by the same applicant.

Several variants are possible within the scope of the attached claims. The features of the above-described preferred embodiment(s) may be replaced by any other feature within the scope of the attached claims, such as the features described in other embodiments, and in the following paragraphs. Product features disclosed in relation to a method are preferred features of the flexible cable, vice versa.

A cable according to the invention may be made of more or less than ten yarns, such as one yarn, two yarns, or at least five yarns. In particular a cable is made of at least twelve yarns, or of twenty-four yarns. The total number of yarn turns, i.e. yarn turns per layer and number of layers, depends on the required strength of the cable, and the strength of one individual yarn, as well as the required safety margin. The number of layers depends on the required number of yarn turns, and the available width in the thimble resulting in a maximum number of yarn turns in the width direction. In particular, each yarn mask at least a thousand turns, more in particular more than five thousand turns.

Different types yarns may be used within the scope of the invention, such as PBO (Polybenzobisoxazole; sold under the name Zylon by TOYOBO CO., LTD), polyarylate fibres (sold under the name Vectran by Kuraray Co., Ltd), para-aramid yarns sold under the name Twaron (registered trademark of Teijin Aramid B.V.) and under the name Kevlar (registered trademark of E.I. du Pont de Nemours and Company) with a density of 1610 dtex, 4830 dtex, 6440 dtex, 16100 dtex, or 17000 dtex, as well as higher, lower, and intermediate densities and with or without a coating, para-copolyamide yarns, sold under the name Technora (registered trademark of Teijin Aramid B.V.), as well as yarns made of fibres with similar properties. Examples of para-armid yarns are Twaron 2100 with a Young's modulus of 65 GPa and Twaron 3200 with a Young's modulus of 138 GPa. The type of fibre for which the current invention offers a solution is a fibre which is relatively susceptible to wear, compared to types of fibres such as UHMWPE or nylon fibres, because of a relative high roughness of a surface of the fibres. In particular, a yarn made of basalt fibres is suitable for an endless winding cable according to the invention. An example is a 24.000 dtex basalt yarn. While the break load and in particular the high Young's modulus make such yarns suitable for an endless winding cable, the current invention solves the issue of wear within the end fitting due to the relative high roughness of the fibres.

In an embodiment, yarn layers in only one of the thimbles is provided with an adhesive. In particular, one thimble of such an embodiment differs from the other thimble such that an adhesive is less beneficial, e.g. if the load on the fibres is smaller due to a larger radius and/or larger width of the respective thimble.

In an embodiment, adhesive is applied to the flexible endless winding cable between the thimbles such, that the flexible endless winding cable between the thimbles remains flexible. An endless winding cable is considered to be flexible if it is capable of being rolled up, e.g. for transport. Such flexibility is present if the different layers of turns of the yarn in the endless winding cable between the thimbles are able to shift with respect to each other in their longitudinal direction. In particular, adhesive is applied to the endless winding cable extending between the thimbles, but not cured and/or adhesive is applied and cured to a minor portion—in length and/or width direction—of the endless winding cable only such, that the endless winding cable as a whole remains flexible.

In an embodiment, a flexible cable comprises more than two thimbles. In such an embodiment, at least two thimbles are present at one end of the flexible cable. Two thimbles in one end fitting form a female end fitting, so that a connection with a further flexible cable can be established by putting a male end fitting between the thimbles of the female end fitting.

In an embodiment, another type of resin may be used, such as a polyester resin, vinyl ester resin, or polyamide. In particular, the resin is a thermosetting polymer.

In an embodiment, the adhesive is applied at one of the thimbles only.

In an embodiment, the adhesive is applied at the thimble(s) of one or both of the end fittings only, and not in the converging sections of the turns of the yarn in the end fitting.

In embodiment, no adhesive is applied at the part of the bearing surface that does not support the turns of yarns, i.e. the non-support region that spans the remaining $(360°-\alpha)$ degrees.

In an embodiment, the adhesive is applied during the process of winding the yarn(s), i.e. adhesive is applied on top of each layer of yarns turns, or on top of every $n^{th}$ layer of yarn turns, wherein n is an integer and equal to or larger than one (1), and smaller than the total number of yarn turns in the stack.

In an embodiment, the adhesive is cured by adding a hardener, such as a polyamine hardener for a resin. In another embodiment, the adhesive is cured by means of radiation, such as IR radiation, UV radiation, or micro wave radiation.

A unidirectional fabric is commonly considered to be non-woven. In practice, the parallel fibres making up the unidirectional fabric need to be stabilized, e.g. by applying a warp thread, which forms a minor portion of the fabric. Within the context of this specification, a fabric is considered to be a unidirectional fabric if at least 95%, in particular at least 99%, of the weight of the fabric is the weight of the parallel fibres. While a unidirectional fabric is preferred as sheet, in other embodiments the sheet is a woven sheet, a braided sheet, or a knitted sheet. In alternative embodiments, the sheet is made of PBO, or high modulus aramid fibres.

The invention achieves an advantageous effect by connecting at least two layers of yarn turns. However, connecting substantially all layers of yarn turns results in an even better increase of life span. Within the context of this specification, substantially all layers of yarn turns is interpreted as at least 80% of the layers, in particular at least 90% of the layers, more in particular at least 95% of the layers.

In general, turns of the yarn engage an angle $\alpha$ of the bearing surface of the thimble in a circumferential direction, wherein $\alpha$ is more than 180° and less than 360° of the circumference of the bearing surface of the thimble. In an embodiment, $\alpha$ is more than 200°, in particular more than 220°, and more in particular more than 240° of the bearing surface of the thimble. In an embodiment, a is less than 340°, in particular less than 320°, and more in particular less than 300° of the bearing surface of the thimble.

The sheet in each end fitting extends at least over the same angle α as the turns of the yarn engage the bearing surface. In particular, the sheets extend from the thimble into the converging section. In particular, the sheets extend at least over 20% and a maximum of 100% of the length of the relevant converging section. In particular, the sheets extend over at least 50%, more in particular at least 75% of the length of the relevant converging section. In particular, the sheets extend at a maximum of 90%, in particular a maximum of 80% of the length of the relevant converging section.

In an embodiment, no sheet is provided in one of, or both, thimbles. In an embodiment, one sheet is provided in one of the, or both, thimbles. In an embodiment, a sheet is provided between every $n^{th}$ and $(n+1)^{th}$ layer of yarn turns, wherein n is an integer, at least one, and less than the number of layers. In an embodiment, n equals ten. In another embodiment, n equals six. In yet another embodiment, n equals three.

In an embodiment, the thimble is made of a plastic material instead of a metal, or of a different metal than stainless steel, including but not limited to different steel alloys, aluminium alloys, magnesium alloys, and titanium.

It is noted that British spelling is applied in the above specification for terms such as 'fibre', 'mould', and 'centre'. These terms can be replaced for the relevant US type of spelling, 'fiber', 'mold', and 'center' without changing the content of this specification.

The invention claimed is:

1. A flexible endless winding cable, comprising:
    a first thimble and a second thimble, and at least one yarn, wherein
        the yarn comprises high modulus synthetic or natural fibers with Young's modulus of at least 55 GPa as determined by ASTM D7269,
        the first thimble and the second thimble are provided at opposite ends of the cable,
        the at least one yarn extends from the first thimble to the second thimble, turns around the second thimble, extends from the second thimble to the first thimble, and turns around the first thimble, such that the yarn forms turns around the first and second thimbles, and each thimble holds a stack of a plurality of layers of turns of the yarn, and
        an adhesive is provided at at least one of the first and second thimble only and mutually connects at least two of the plurality of layers of turns of the yarn in the stack of the respective first or second thimble to retain a tangential orientation of the respective yarn layers with respect to each other when the flexible endless winding cable is subject to a load.

2. The cable according to claim 1, wherein the high modulus synthetic fibers are para-aramid fibers.

3. The cable according to claim 1, comprising at least a first sheet which is provided in the stack (9) of layers of turns of the yarn between two layers of the stack of one of the first and second thimble.

4. The cable according to claim 3, wherein the at least first sheet is one of a plurality of sheets, wherein each sheet is provided separately in the stack of layers of turns of the yarn between two layers of the stack of the one of the first and second thimble.

5. The cable according to claim 3, wherein the at least first sheet comprises a unidirectional fabric.

6. The cable according to claim 3, wherein the stiffness of the at least first sheet is greater than the stiffness of the yarn.

7. The cable according to claim 3, wherein the at least first sheet comprises sheet fibers and the Young's modulus of the sheet fibers is higher than the Young's modulus of the high modulus synthetic fibers of the yarn.

8. The cable according to claim 3, wherein the at least first sheet comprises fibers which are chosen from a list consisting of carbon fibers, PBO fibers, and high modulus aramid fibers.

9. The cable according to claim 1, wherein the stack of the plurality of turns of the yarns of each thimble engages the respective thimble along a part of the respective thimble's circumference, wherein the adhesive provided at said at least one of the first and second thimble extends over at least a portion of said circumferential part of the respective first (2) or second thimble.

10. The cable according to claim 9, wherein the adhesive extends over the entire circumferential part.

11. The cable according to claim 9, wherein the adhesive extends over the portion of the circumferential part only.

12. The cable according to claim 11, wherein the portion of the circumferential part is centered about the longitudinal axis of the cable.

13. The cable according to claim 1, wherein the adhesive comprises a resin or an epoxy resin.

14. The cable according to claim 1, wherein the high modulus synthetic or natural fibers are selected from the group consisting of: aramid fibers, polyarylate fibers, PBO fibers, and basalt fibers.

15. A method for producing a flexible endless winding cable, comprising the steps of:
    positioning a first thimble and a second thimble at a predetermined distance from one another, which distance corresponds to a required cable length,
    providing at least one yarn, which yarn comprises high modulus synthetic or natural fibers with Young's modulus of at least 55 GPa as determined by ASTM D7269,
    winding the at least one yarn from the first thimble to the second thimble, a half turn around the second thimble, back to the first thimble, and a half turn around the first thimble,
    repeating the previous step until a predetermined number of layers of yarn turns is provided in both the first thimble and the second thimble, corresponding to a required cable thickness,
    applying an adhesive to the layers of yarn turns in at least one of the thimbles, and
    curing the adhesive to connect at least two of the layers of yarn turns so that the layers of yarn turns in at least one of the thimbles retain a tangential orientation with respect to each other when the flexible endless winding cable is subject to a load, and so that the flexible endless winding cable remains flexible between the first thimble and the second thimble.

16. The method according to claim 15, comprising putting at least a first sheet on one of the layers of yarn turns in one of the first and second thimbles after providing at least one layer of yarn turns and before providing a subsequent layer of yarn turns.

17. The method according to claim 16, comprising putting a further sheet on another one of the layers of yarn turns in said one of the first and second thimbles.

18. The method according to claim 16, wherein the adhesive is applied so that the adhesive penetrates substantially all layers of yarn turns, as well as the sheet, and wherein the step of curing the adhesive results in connecting all layers of yarn turns and the sheet so that substantially all layers of yarn turns retain a tangential orientation with respect to each other when the flexible endless winding cable is subject to a load.

19. The method according to claim 15, wherein the step of applying the adhesive to the layers of yarn turns in at the least one of the thimbles is repeated after n layers of yarn turns are provided in at least one of the thimbles, and wherein n is an integer of less than 10.

20. The method according to claim 15, wherein the adhesive is applied so that the adhesive penetrates substantially all layers of yarn turns and wherein the step of curing the adhesive results in connecting all layers of yarn turns so that substantially all layers of yarn turns retain a tangential orientation with respect to each other when the flexible endless winding cable is subject to a load.

21. The method according to claim 15, wherein the step of applying the adhesive to the layers of yarn turns in at the least one of the thimbles is repeated after n layers of yarn turns are provided in at least one of the thimbles, and wherein n is an integer of less than 5.

* * * * *